Patented Jan. 24, 1933

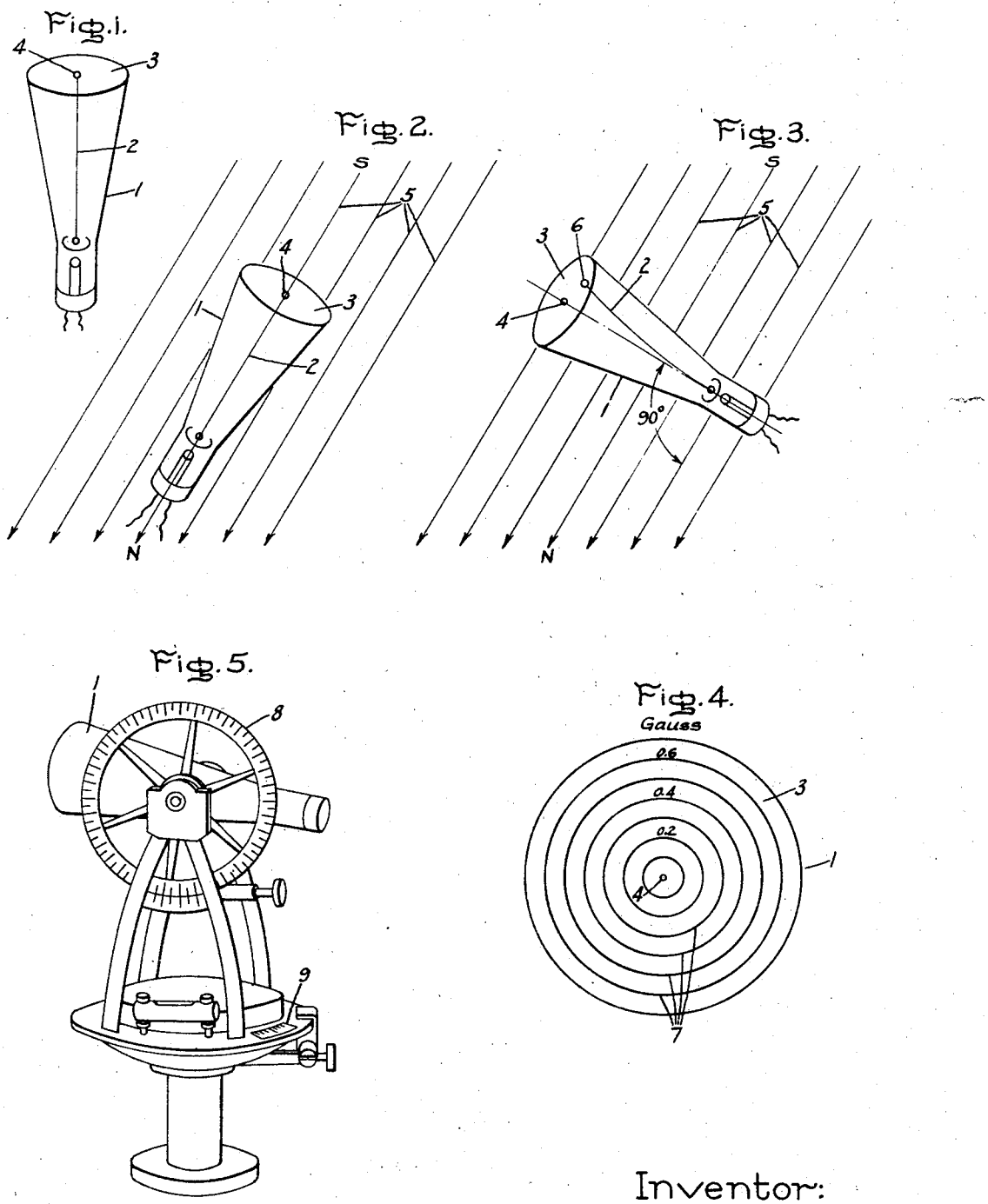

1,895,373

UNITED STATES PATENT OFFICE

ERNST BRÜCHE, OF DANZIG, FREE CITY OF DANZIG, ASSIGNOR TO GENERAL ELECTRIC COMPANY, A CORPORATION OF NEW YORK

APPARATUS FOR MEASURING MAGNETIC FIELDS

Application filed December 24, 1930, Serial No. 504,619, and in Germany March 8, 1930.

My invention relates to apparatus for measuring a magnetic field, particularly a field which for a few decimeters of length is substantially homogeneous in character as is, for example, the earth's field. It is the object of my invention to provide improved apparatus for this purpose which is simple in construction, efficient in operation and inexpensive to manufacture.

My invention will be better understood from the following description taken in connection with the accompanying drawing, and its scope will be pointed out in the appended claims.

Referring to the drawing, Fig. 1 is a perspective view of a cathode ray tube forming a part of the complete apparatus involving my invention; Figs. 2 and 3 show the cathode ray tube in two positions relative to a magnetic field to be measured; Fig. 4 is an enlarged view of the graduated end wall of the tube; and Fig. 5 shows the complete apparatus.

The cathode ray tube 1 which I employ has means well known to those skilled in the art for producing the slender pencil of rays 2 and has the end wall 3 covered with suitable material to produce a fluorescent screen. The point at which the cathode ray impinges upon the fluorescent screen in its normal undeflected position is marked by the spot 4 which preferably is the center of the end wall of the tube. If the tube be turned so that its axis, which is assumed to coincide with the normal position of the pencil of rays, extends in the same direction as the magnetic field represented by the lines 5 in Fig. 2, the rays will suffer no deflection. Hence when the angular position of the tube is such that the rays hit the spot 4 it indicates the direction of the field. If the tube be turned at right angles to the direction of the magnetic field as illustrated by Fig. 3 the rays will be deflected to the point 6, the displacement of point 6 from the zero point 4 being a measure of the strength of the field. In Fig. 4 I have shown an enlarged view of the end wall of the tube provided with graduations 7, reading in fractions of a gauss, and comprising circles concentric with the zero spot 4.

In Fig. 5 I have illustrated by way of example a modified form of theodolite in which the cathode ray tube 1 takes the place of the usual telescope. The theodolite has the usual vertical scale 8 for measuring the inclination of the tube and the horizontal scale 9 upon which may be read the declination. Thus the cathode ray tube as so mounted may be turned in any desired direction and by means of the two scales the inclination and declination of the magnetic field may be measured.

What I claim as new and desire to secure by Letters Patent of the United States is:

1. Apparatus for measuring the strength of a magnetic field comprising a cathode ray tube having means for indicating the non-deflected position of the ray and calibrated means for holding the tube in various angular positions.

2. Apparatus for measuring the strength of a magnetic field comprising a cathode ray tube having means for indicating the non-deflected position of the ray and a holder for the tube having means by which the tube may be adjusted angularly in a vertical and horizontal direction.

3. Apparatus for measuring the strength of a magnetic field comprising a cathode ray tube having means for indicating the non-deflected position of the ray and a holder for the tube having means by which the tube may be given a universal angular adjustment, and means for indicating vertical and horizontal positions of the tube.

4. Apparatus for determining the direction and measuring the strength of a magnetic field comprising a cathode ray tube having ray deflection graduations thereon, and a holder for the tube angularly adjustable vertically and horizontally and having vertical and horizontal graduations.

5. Apparatus for determining the direction and measuring the strength of a magnetic field comprising a cathode ray tube having a zero deflection indication and deflection graduations comprising a series of circles concentric therewith, and a holder for the tube comprising a tube engaging portion angularly adjustable about a vertical axis and angularly adjustable about a horizontal axis, and scales for indicating both angular adjustments.

In witness whereof, I have hereunto set my hand this 4th day of December, 1930.

ERNST BRÜCHE.